United States Patent [19]
DuLac et al.

[11] Patent Number: 5,748,871
[45] Date of Patent: May 5, 1998

[54] DUAL BUS ARCHITECTURE FOR A STORAGE DEVICE

[75] Inventors: Keith B. DuLac, Derby; Grover G. Phillips, Andover, both of Kans.

[73] Assignee: Symbios Logic Inc., Fort Collins, Colo.

[21] Appl. No.: 514,479

[22] Filed: Aug. 11, 1995

[51] Int. Cl.⁶ .................................................. G06F 11/00
[52] U.S. Cl. ......................................................... 395/182.03
[58] Field of Search ...................... 395/182.07, 182.04, 395/181, 185.01, 185.02, 185.09, 182.03, 182.02, 185.07, 185.06; 371/51.1

[56] References Cited

U.S. PATENT DOCUMENTS

| | | | |
|---|---|---|---|
| 4,190,870 | 2/1980 | Avina et al. | 360/98 |
| 4,423,448 | 12/1983 | Frandsen | 360/106 |
| 4,484,273 | 11/1984 | Stiffler et al. | 395/290 |
| 4,607,365 | 8/1986 | Greig | 371/8 |
| 4,701,865 | 10/1987 | Goodman | 364/521 |
| 4,783,733 | 11/1988 | Greig | 364/200 |
| 4,903,227 | 2/1990 | Fukushima | 364/900 |
| 4,920,478 | 4/1990 | Kanamatu | 364/200 |
| 4,920,479 | 4/1990 | Hashiguchi | 364/200 |
| 4,933,846 | 6/1990 | Humphrey et al. | 395/287 |
| 4,972,396 | 11/1990 | Rafner | 369/32 |
| 5,109,348 | 4/1992 | Pfeiffer et al. | 395/164 |
| 5,119,372 | 6/1992 | Verbeek | 370/85.3 |
| 5,235,689 | 8/1993 | Baker | 395/425 |
| 5,289,478 | 2/1994 | Barlow et al. | 371/40.1 |
| 5,313,627 | 5/1994 | Amini et al. | 395/185.06 |
| 5,394,526 | 2/1995 | Crouse | 395/200 |
| 5,396,596 | 3/1995 | Hashemi | 395/250 |
| 5,402,428 | 3/1995 | Kakuta | 371/10.1 |
| 5,463,643 | 10/1995 | Gaskins | 371/40.1 |
| 5,471,586 | 11/1995 | Sefidvash | 395/284 |
| 5,511,224 | 4/1996 | Tran et al. | 395/308 |
| 5,524,113 | 6/1996 | Gaddis | 370/60.1 |
| 5,546,535 | 8/1996 | Stallmo | 395/182.07 |
| 5,581,566 | 12/1996 | St. John | 371/37.6 |
| 5,594,732 | 1/1997 | Bell | 370/401 |
| 5,600,804 | 2/1997 | Ip | 395/309 |
| 5,604,509 | 2/1997 | Moore | 345/2 |
| 5,604,753 | 2/1997 | Bauer et al. | 395/182.15 |
| 5,649,090 | 7/1997 | Edwards et al. | 395/185.07 |

FOREIGN PATENT DOCUMENTS

| | | | |
|---|---|---|---|
| 0576136 | 12/1993 | European Pat. Off. | H04L 1/00 |
| 0646858 | 4/1995 | European Pat. Off. | G06F 3/06 |

Primary Examiner—Albert Decady
Attorney, Agent, or Firm—Duke W. Yee; Wayne P. Bailey

[57] ABSTRACT

An apparatus includes a first bus, a second bus, and a storage module having a first and second output with the first output being connected to the first bus and a second output being connected to the second bus. A first buffer storage and a second buffer storage in which the first buffer storage is connected to the first bus and the second buffer storage is connected to the second bus. The second buffer storage includes an error correction module. First and second network adapters are connected to the first and second buses respectively. The first network adapter also includes a connection to the first buffer. A processor in the apparatus includes a first processor circuitry for transferring the data using a first path through the first output in the storage module to the first buffer storage and from the first buffer storage to the first network adapter. A second processor circuitry is for transferring data using a second path through the second output to the second buffer storage through the error correction module and from the second buffer storage to the second network adapter, wherein the second processor circuitry is responsive to an error in the storage module.

26 Claims, 5 Drawing Sheets

DUAL BUS ARCHITECTURE FOR A STORAGE DEVICE

CROSS-REFERENCE TO RELATED APPLICATIONS

The present application contains subject matters related to co-pending application Ser. No. 08/514,013, entitled *Video Storage Unit Architecture*, Attorney No. 95-019, filed on even date herewith and assigned assignee hereof and incorporated by reference herein.

BACKGROUND OF THE INVENTION

1. Technical Field

The present invention relates generally to storage devices and in particular to an apparatus for increasing performance of storage devices. Still more particularly, the present invention relates to an apparatus for increasing bandwidth of data transferred to and from a storage device.

2. Description of the Related Art

A mass storage system is typically in the form of a disk or tape storage for storing large masses of data in comparison with computer memory capacity. Mass storage systems provide long-term memory to a computer. Various types of mass storage system mediums include hard disk drives and, to a lessor extent, floppy disk drives. Other technologies are becoming prominent in providing mass storage. For example, laser-based optical systems, such as CD ROM, are becoming more common.

Mass storage systems can be on-line, instantly accessible by a data processing system or off-line, requiring some extra intervention to obtain access, such as placing a cartridge into a drive. Juke boxes for CD-ROM cartridges provide near-line storage. Mass storage systems include a single storage device or may contain multiple storage devices.

With improvements in compression technologies and mass storage systems, applications such as video-on-demand (VOD), video editing, interactive games, home shopping, and other multimedia applications have been developed. Video-on-demand services may include, for example, movies, sporting events, textural information, educational programs, and arts programs.

A "multimedia application" is an application that uses different forms of communication in one application. For example, information can be displayed on a data processing system using voice, text, and video simultaneously. A multimedia data processing system allows text, graphics, and audio to be displayed simultaneously. These types of multimedia applications are referred to collectively as "video", and it should be understood that a video generally includes both video and audio portions, although, in some instances, a video may include an image portion as in textual information, or only an audio portion, as for example music.

Two major concerns with storing video in a mass storage system is how to maximize the number of video viewers (the number of video data streams) from the mass storage system and how to guarantee that these users can continue to be supported when a storage device in the mass storage system fails. A mass storage system for storing video is called a "video storage unit".

The bandwidth provided by a video storage unit determines the number of video data streams that the mass storage system can sustain. Typically, a requested compressed video data stream can require a bandwidth of three megabits per second (Mb/s). If a video storage unit has a 30 megabyte resource, the data processing system to which the video storage unit is connected to is typically capable of an 80 video stream output.

The components in a video storage unit that effect bandwidth are the storage device, high speed video buffers for holding video data about to be transmitted through the network adapter, and the connection bus or buses for those components. Presently, increasing the bandwidth on a bus requires increasing the bit width of the bus.

Therefore, it would be advantageous to have an improved method and apparatus for increasing the bandwidth on a video storage unit or other mass storage system without increasing the width of the buses themselves.

SUMMARY OF THE INVENTION

The present invention provides an apparatus for expanding the usable bandwidth in a mass storage system using a dual bus architecture. The present invention provides an apparatus that includes a first bus, a second bus, and a storage module having a first and a second output with the first output being connected to the first bus and a second output being connected to the second bus. The apparatus also includes a first buffer storage and a second buffer storage in which the first buffer storage is connected to the first bus and the second buffer storage is connected to the second bus. The second buffer storage includes an error correction module. First and second network adapters are connected to the first and second buses respectively. The first network adapter also includes a connection to the first buffer. A processor in the apparatus includes a first processor means for transferring the data using a first path from the first output in the storage module to the first buffer storage and from the first buffer storage to the first network adapter. The processor also includes a second processor means for transferring data using a second path from the second output to the second buffer storage through the error correction module and from the second buffer storage to the second network adapter, wherein the second processor means is responsive to an error in retrieving data from the storage module.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
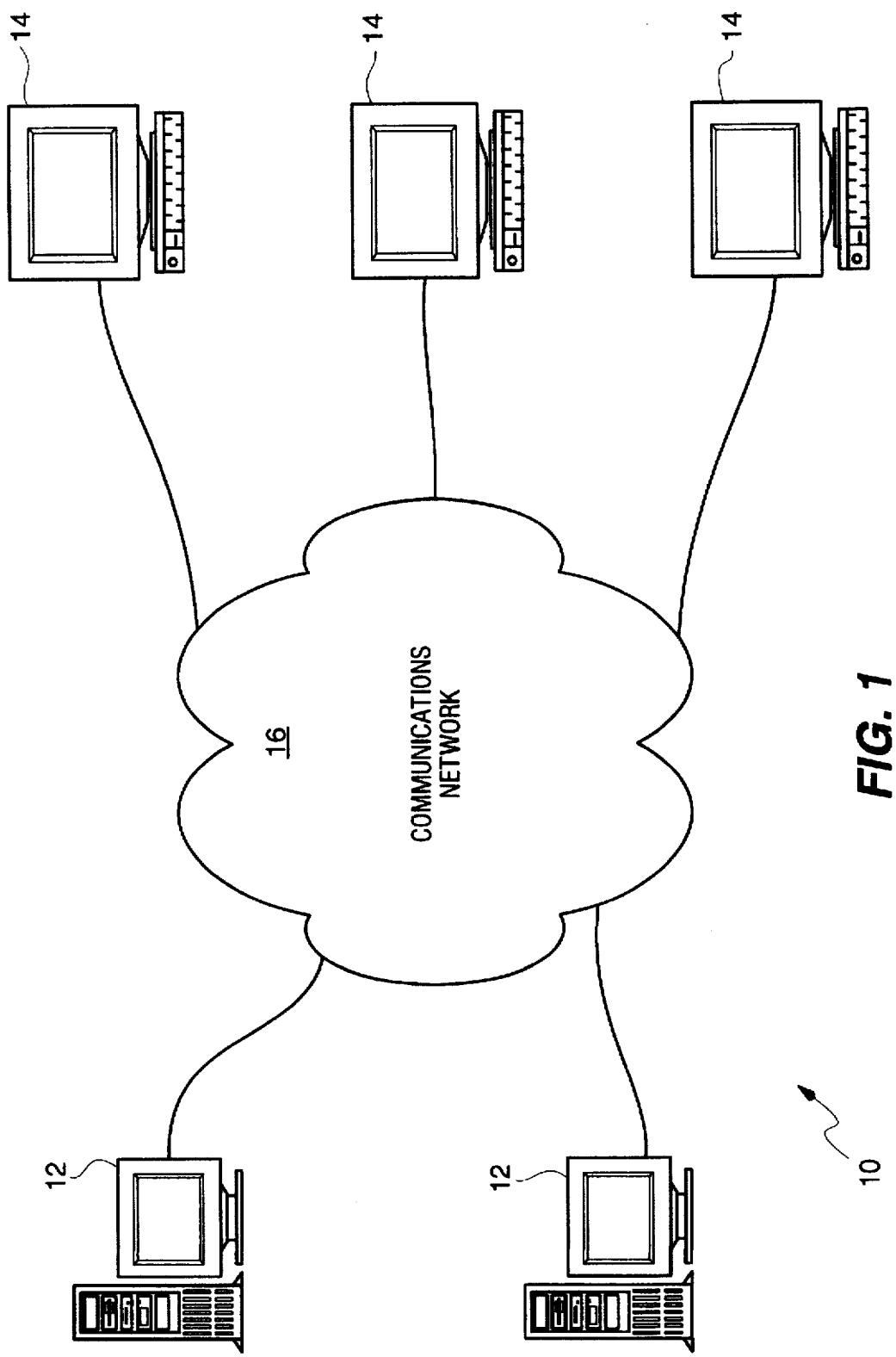
FIG. 1 is an illustration of a distributed data processing system.

With reference to FIG. 1, a distributed data processing system 10 for providing video is depicted in accordance with a preferred embodiment of the present invention. Distributed data processing system 10 includes one or more data processing systems 12, user systems 14 distributed over a large geographical area, and a communications network 16. Generally, videos are transferred from data processing system 12 to user systems 14 over communications network 16. In addition, videos may be transferred between data processing systems 12.

The physical medium employed in communications network 16 for communicating between data processing system 12 and user system 14 can be, for example, a twisted pair of wires, a coaxial cable, a fiber optic cable, a microwave link, or a satellite link. The continuous physical path used for communicating is called a circuit. The circuit includes a relatively small bandwidth "bi-directional" channel for communicating control signals and a relatively large bandwidth "downstream" channel for communicating video data. This circuit may include additional channels, for example, a medium bandwidth channel allocated for two-way communications such as telephone service may be employed.

In the depicted example, distributed data processing system 10 is a broadband communications system including Synchronized Optical Network (SONET), Asynchronous Transfer Mode (ATM), and Intelligent Networks (IN). Services available across distributed data processing system 10 may include video voice mail—a voice activated remote video answering machine; interactive video phone—a voice activated-video based telephone conversation; data and video transfer—a voice activated accessing of information from remote text and video libraries across wide geographic areas; and VOD. In addition to these, numerous other multimedia applications may be provided by broadband communications in distributed data processing system 10.

To support audio and video, video servers in distributed data processing system 10 must support storage of vast amounts of data. For example, 10 minutes of uncompressed full motion video typically consumes 22 gigabytes of memory. Presently available compression standards, such as Joint Photographic Experts Group (JPEG) and Motion Picture Experts Group (MPEG) are employed to compress data. More information on communication networks involving broadband communications networks and architecture along with data transfer standards can be found in *Kumar, Broadband Communications: A Professional's Guide To ATM, Frame Relay, SMDS, SONET, and BISDN*, McGraw-Hill, Inc. (1995).

User systems 14 comprise an interface/controller box connected to the network and a viewing device such as a monitor or a television in the depicted example. Alternatively, the configuration of user systems 14 may be work stations.

Figure 2:
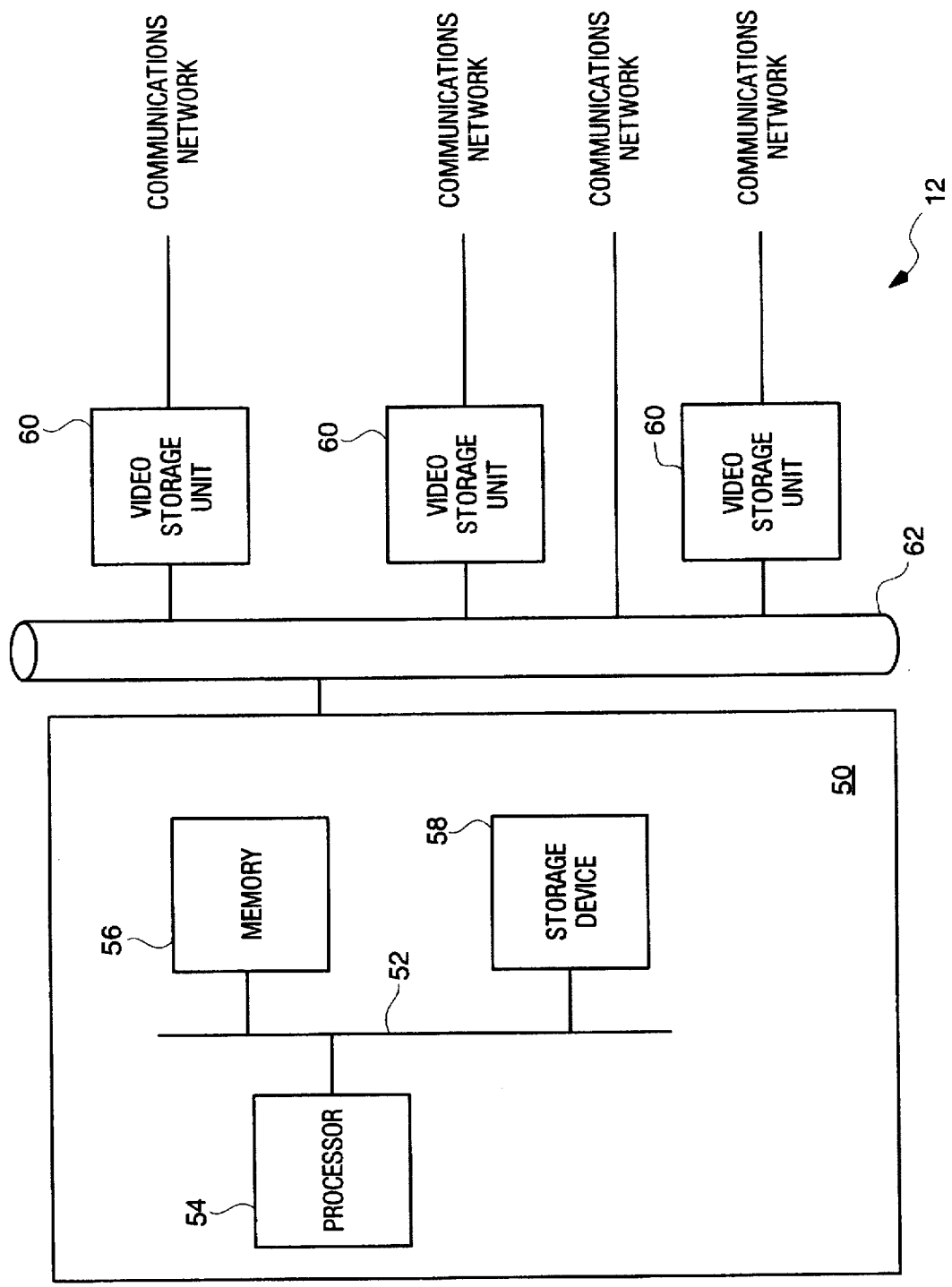
FIG. 2 is a diagram of a data processing system.

With reference now to FIG. 2, a diagram of a data processing system is illustrated according to the present invention. Data processing system 12 includes a video server 50 that contains a system bus 52, interconnecting a number of components. In particular, processor 54, memory 56, and storage device 58 are in communication with each other via system bus 52 inside video server 50. Programs supporting system and network management are executed by processor 54. While any appropriate processor can be used for processor 54, the Pentium microprocessor, which is sold by Intel Corporation and the PowerPC 620, available from International Business Machines Corporation and Motorola, Inc. are examples of suitable processors. "Pentium" is a trademark of the Intel Corporation and "PowerPC" is a trademark of International Business Machines Corporations. Additionally, business support databases may be found on storage device 58. These databases are employed to track incoming requests for videos and statistical data, such as peak request times for videos, frequency of requests for videos, and identification of users requesting videos. Video server 50 is connected to a communications bus 62, like ethernet.

Specifically, video server 50 may be implemented using any suitable computer, such as the IBM PS/2 or an IBM RISC SYSTEM/6000 computer, both products of International Business Machines Corporation, located in Armonk, N.Y. "RISC SYSTEM/6000" is a trademark of International Business Machines Corporation. Additionally, video storage units 60, according to the present invention, are connected to video server 50 by communications bus 62. Communications bus 62 also provides video server 50 a connection to communications network 16 in FIG. 1.

Figure 3:
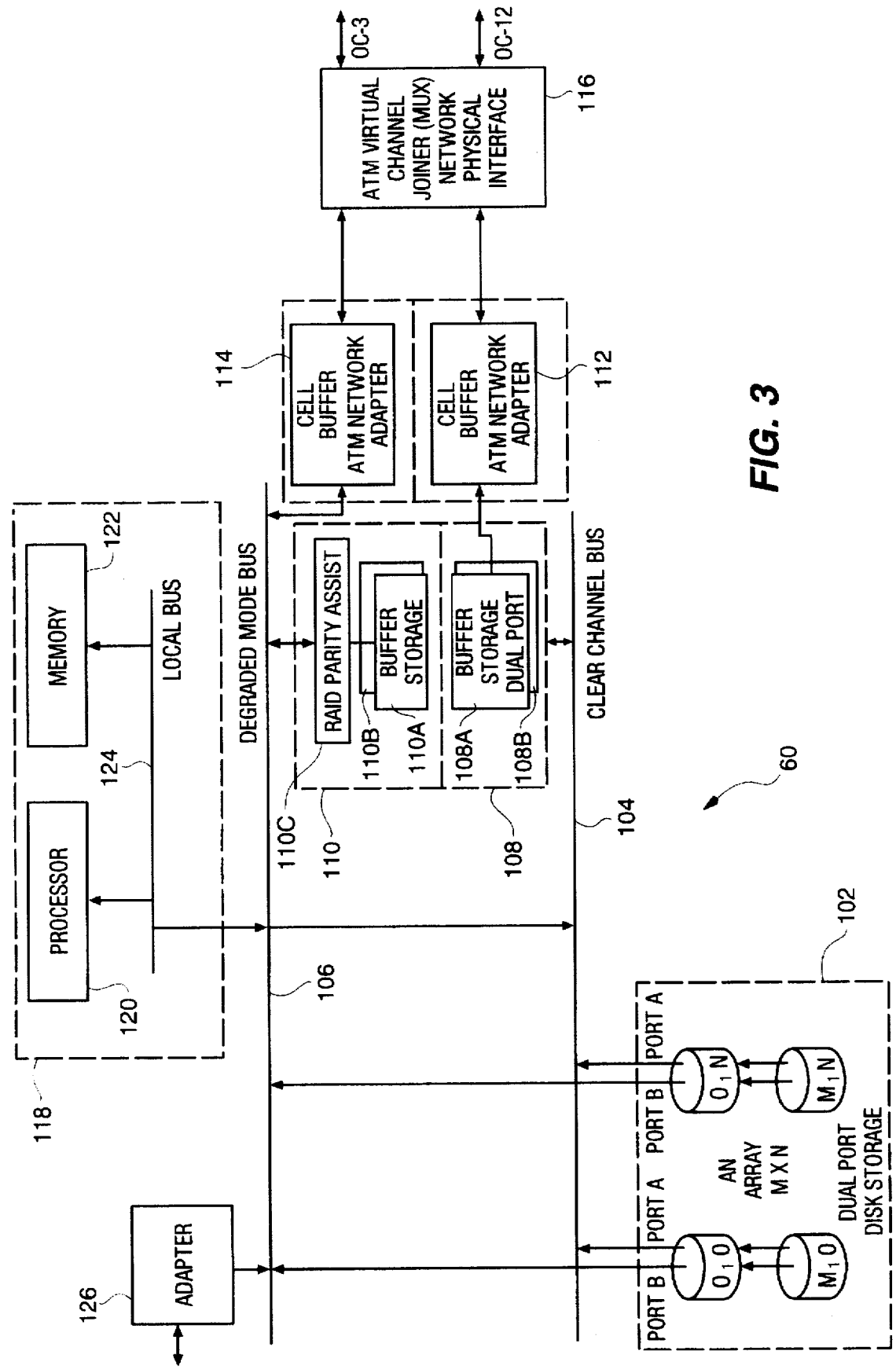
FIG. 3 illustrates a block diagram of a video storage unit according to the present invention.

FIG. 3 illustrates a block diagram of a video storage unit implementing a dual bus, dual port architecture according to the present invention. Video storage unit 60 stores videos in the form of digital video data files in storage module 102. Digital video data is moved from storage module 102 over either clear channel bus 104 or degraded mode bus 106 to buffer storage 108 or buffer storage 110, respectively. Clear channel bus 104 and degraded mode bus 106 may be implemented using presently available buses, such as, for example, a Peripheral Component Interconnect bus using the PCI standard. The digital video data is then moved to network adapter 112 or network adapter 114 and then to broadband communications network 16 via multiplexer unit 116 in the form of video data streams, in which each video data stream represents digital video data for a particular video. The movement of digital video data is controlled by control module 118 in video storage unit 60.

Control module 118 includes a processor 120 and a memory 122 connected together by local bus 124. Local bus 124 connects these elements to clear channel bus 104 and degraded mode bus 106. Memory 122 contains the instructions or executable programs that control the movement of data in video storage unit 60. Requests for digital video data from storage module 102 are received by control module 118 from either communications network 16 through multiplexer 116 or through some other connection such as an ethernet adapter 126 in video storage unit 60.

Storage module 102 includes M ranks of N disk drives in the depicted example. Each disk drive is a dual port disk drive, including two ports, port A and port B. Port A of each drive is connected to clear channel bus 104 while port B of each drive is connected to degraded mode bus 106. Storage module 102 may be implemented using presently available dual port disk drives. Digital video data can be striped across a rank of dual port disk drives, such as disk drives (0,0) to (0,N).

Digital video data is retrieved from a rank of disk drives using port A in the rank of disk drives and stored in buffer 108a in buffer storage 108. When buffer 108a is full or ready to read by network adapter 112, data read from the rank is then stored in buffer 108b in buffer storage 108. In the depicted example, buffer 108a and buffer 108b are dual port storage buffers that allow simultaneous reads of the same memory location in a fully asynchronous operation from either port. Clear channel bus 104 in the depicted example is a PCI bus that presently sustains a rate of 80 megabytes per second on ranks 0 to M for data being read from port A out of storage module 102.

In the event a disk drive fails in storage module 102, control module 118 accesses data from port B in the failed rank of disk drives such that the redundant drives in the failed rank of disk drives plus all other non-failing drives in the failed rank transfer digital video data and error correction data, such as parity bits, over degraded mode bus 106 to buffer storage 110. Buffer storage 110 includes buffer 110a and buffer 110b. Additionally, buffer storage 110 also includes error correction module 110c. The retrieved digital video data is reconstructed using error correction module 110c and error correction data. In the depicted example, error correction module 110c is a RAID parity assist module that is a hardware implementation of a RAID operation for parity correction. The responses back from the dual port storage 102 key the control module 108 if data in non-retrievable. That in turn invokes a RAID operation. The type of RAID operation performed depends on the RAID implementation used in storage module 102. According to the present invention, data may be reconstructed using degraded mode bus 106 while data from non-failing ranks of disk drives in storage module 102 are transferred over the clear channel bus. Increased bandwidth is achieved in clear channel bus 104 because error correction data, such as parity bits, do not have to be transferred with the digital video data. As a result, additional video data streams may be transferred through clear channel bus 104. Error correction data is transferred only in the event that an error occurs in retrieving data from storage module 102. At that time, digital video data and error correction data are retrieved and sent on degraded mode bus 106 for processing and for correcting any errors in data using RAID parity module 110c.

As with buffer storage 108, reconstructed data along with other data are stored in buffer 110 until the data is ready to be transmitted or buffer 110a becomes full. At that point, data is transferred to network adapter 114 over degraded mode bus 106 while additional data is then read into buffer storage 110b.

If a video being transmitted to a user is located on several ranks of disk drives, including a rank with a failed disk drive, data will be sent over both clear channel bus 104 and degraded mode bus 106 for this particular video stream. As a result, data for the video will be sent to network adapters 112 and 114.

In the depicted example, network adapters 112 and 114 are ATM network adapters that group digital video data into "cells" and associate routing information, such as Virtual Channel Identifiers (VCIs) and Physical Channel Identifiers (PCIs), with the cells. More information on ATM can be found in Goralski, *Introduction to ATM Networking*, McGraw-Hill, Inc. (1995). Multiplexer 116 sends the data to the appropriate lines based on routing information, VCI and VPI, digital video associated with the data in network adapters 112 and 114. Multiplexer 116 sends the cells to the correct physical network link, such as link OC-3 and OC-12 in FIG. 1 using the PCI bus. Within each link, multiplexer 116 sends the cells to the correct virtual channel based on the VCI. Multiplexer 116 routes the reconstructed video data as a function of the VCI to provide a seamless transfer of video data on as set up by and through the broadband network connected to the user. The VCI number is typically used as an unique identifier for the user on an physical channel. The physical channel is a connection that is maintained for transmitting reconstructive video data by multiplexer 116. The data containing the VCI and VPI for a particular video are maintained in memory 122 of control module 118.

Additionally, according to the present invention, control module 118 may also send video data from non-failed ranks over degraded mode bus 106 without activated RAID parity assist module 110c. As a result, degraded mode bus 106 can provide the same bandwidth as clear channel bus 104.

Additionally, the present invention recombines data from separate internal buses, clear channel bus 104 and degraded mode bus 106, by employing switching characteristics from ATM protocols (i.e., VCI and VPI) to control dynamic switching to the communications network.

By proper video data layout and placement in storage module 102, no degradation will occur if high use videos are not all placed on one rank. The present invention also provides the advantage of providing service to more users by the increased bandwidth supplied by clear channel bus 104 and degraded mode bus 106 when protection from failed storage devices is not required.

Figure 4:
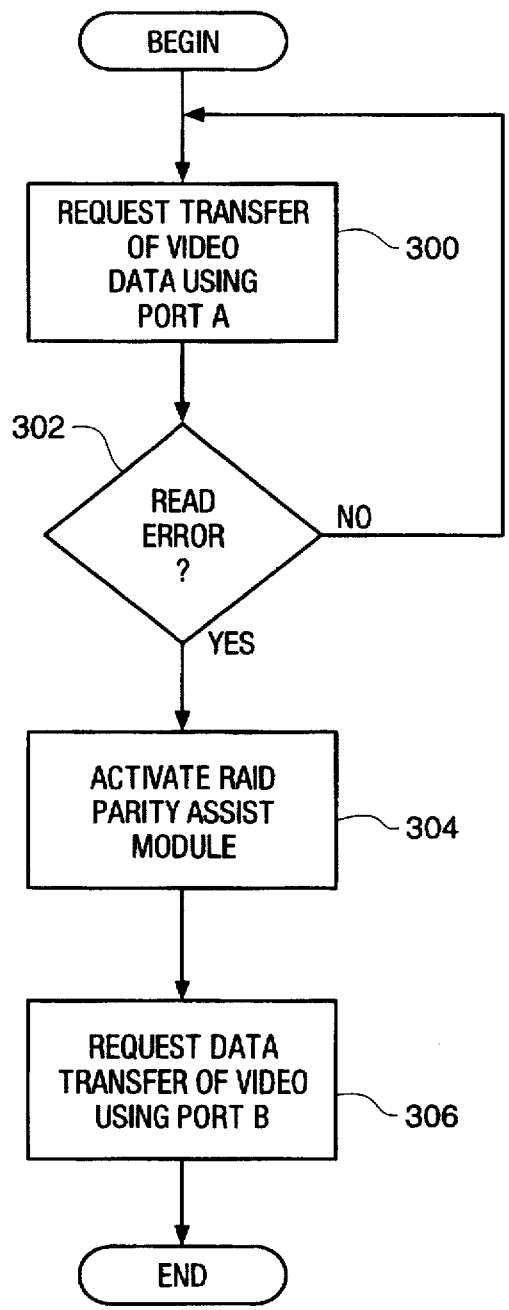
FIG. 4 depicts a flowchart of processes for switching from a clear channel bus to a degraded mode bus in the event of an error in a storage device.

Turning now to FIG. 4, this figure depicts a flowchart of a process for switching from a clear channel bus to a degraded mode bus in the event of an error in a storage device. The process begins by requesting data transfer of video data using port A in storage module 102 (step 300). A determination is made as to whether a read error has occurred (step 302). In the event that a read error has occurred, the RAID parity assist module is activated (step 304). The processor then requests data from port B in the storage module (step 306) with the process terminating therafter. If no read error occurs, the process continues to transfer data on port A.

Figure 5:
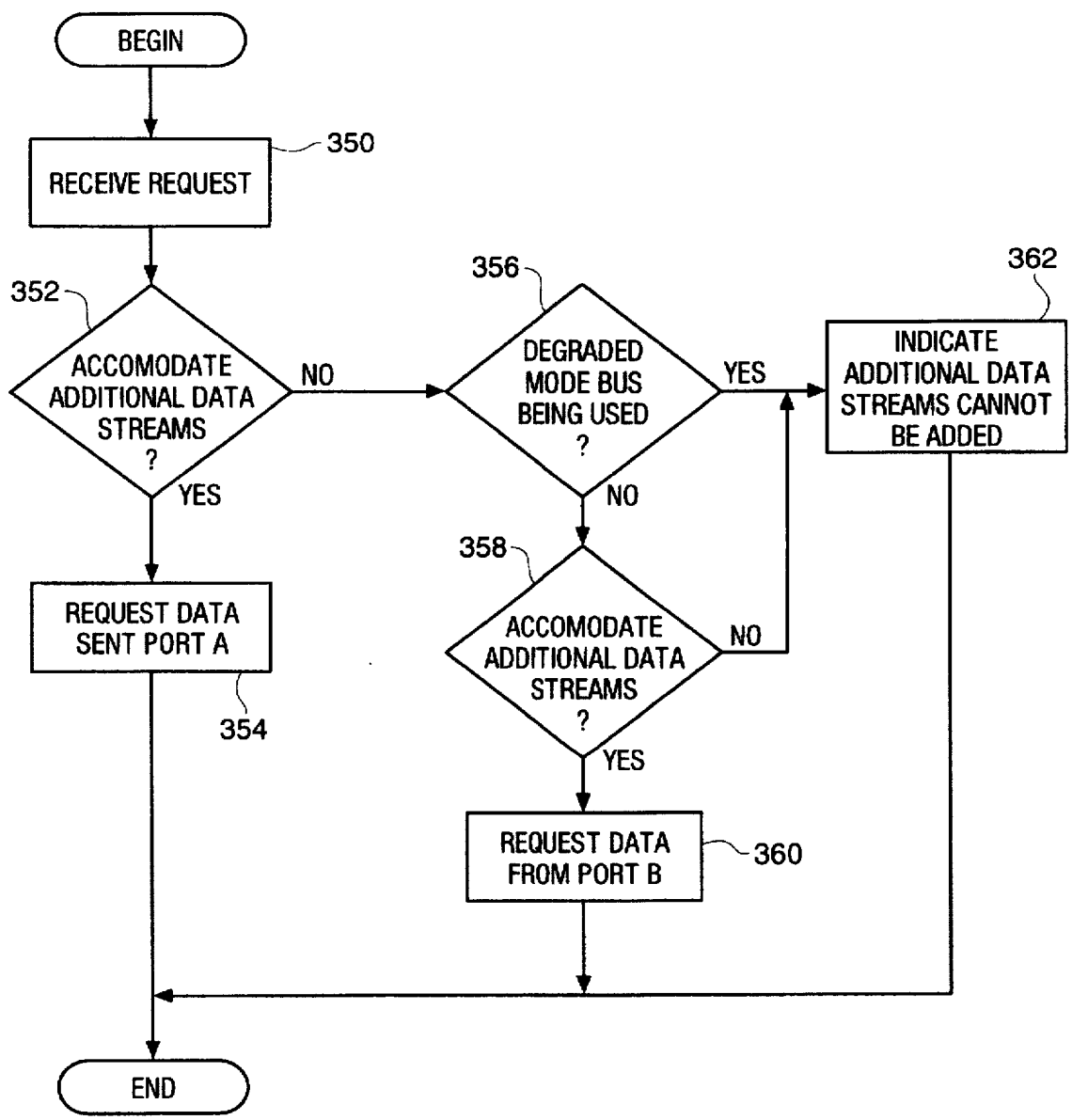
FIG. 5 is a flowchart of a process for increasing the number of data streams in a video storage unit.

In FIG. 5, a flowchart of a process for increasing the number of data streams in a video storage unit is depicted. The process begins by receiving a request to increase the number of data streams (step 350). A determination is made as to whether the clear channel bus can accommodate the additional data streams requested (step 352). The determination of whether additional data streams can be placed on the clear channel bus without degrading performance can be made by comparing the number of data streams presently being transferred on the clear channel data bus with a preselected number. This preselected number is calculated based on the various factors, such as the rate at which data must flow for the data streams, the size of the bus, and other factors related to the architecture of the video storage unit.

If additional data streams can be maintained on the clear channel bus, the request for data is sent to port A of the disk drives (step 354). On the other hand, if additional data streams cannot be supported by the clear channel bus, a determination is made as to whether the degraded mode bus is being used in response to a disk failure (step 356). A determination also is made as to whether the degraded mode bus can handle an additional video data streams if the degraded mode bus is not being used in response to a disk failure (step 358). If the degraded mode bus is not being used for data involving a failed drive and can handle an additional video data stream requests, the process data from port B of the disk drives (step 360) with the process terminating thereafter. Steps 356, 358, and 360 are optional. In some instances, it is desirable to leave the degraded mode bus clear to handle a failure of a disk drive in storage module 102. If the degraded mode bus is being used for data involving a failed disk, the process returns an indication that additional data streams cannot be added (step 362).

The present invention provides a relatively simple means to increase the number of video data streams from a disk storage array and to maintain the data stream rate at some selected level in the event of a storage device failure. The present invention provides an advantage of expanding the useable bus bandwidth for transmitting video data streams through using a dual port storage device in connection with a dual bus architecture. Although the depicted example shows hard drives, other types of dual port storage devices, such as optical disk drives, random access memories, or read only memories can be employed. Under the present invention, the bandwidth can be extended up to a factor of three without employing expensive custom buses. Additionally, the present invention provides the advantage of allowing reconstruction of data from a failed rank of disk drives while allowing data from non-failing ranks of disk drives to be transferred over the clear channel bus and to broadband network connections using a multiplexer.

While the invention has been particular shown and described with reference to a preferred embodiment, it will be understood by those skilled in the art that various changes in form and detail may be made therein without departing from the spirit and scope of the invention. For example, although the depicted embodiment is directed towards data in the form of digital video data, the present invention may be employed for other purposes other than providing digital video data.

What is claimed is:

1. An apparatus comprising:

a first bus;

a second bus;

a storage module, the storage module having a first output and a second output, the first output being connected to the first bus and the second output being connected to the second bus, wherein data is stored in the storage device;

a first buffer storage connected to the first bus;

a second buffer storage including an error correction module, the second buffer storage being connected to the second bus;

a first network adapter connected to an output of the first buffer;

a second network adapter connected to the second bus; and a processor including a first processor means for transferring the data using a first path from the first output to the first buffer storage and from the first buffer storage to the first network adapter and second processor means for transferring the data using a second path from the second output to the second buffer storage and from the second buffer storage to the second network adapter, wherein the second processor means is responsive to an error in the storage module and wherein errors in data are detected and corrected by the error correction module.

2. The apparatus of claim 1, wherein the storage module includes a plurality of storage devices.

3. The apparatus of claim 2, wherein each of the plurality of storage devices are dual port storage devices wherein a first port of each dual port storage device is connected to the first output of the storage module and a second port of each dual port storage device is connected to a second output of the storage module.

4. The apparatus of claim 3, wherein the plurality of storage devices are hard disk drives.

5. The apparatus of claim 4, wherein each of the hard disk drives are dual port hard disk drives.

6. The apparatus of claim 1, wherein the data is a plurality of files.

7. The apparatus of claim 1, wherein the data comprises a plurality of videos in the form of digital video files.

8. An apparatus comprising:

a first bus;

a second bus;

a storage module containing a plurality of storage devices, the storage module having a first output and a second output;

a first buffer storage connected to the first bus;

a second buffer storage connected to the second bus, wherein the second buffer storage includes an error correction module;

a first network adapter connected to the output of the first buffer;

a second network adapter connected to the second bus; and the apparatus having two modes of operation:

a first mode of operation in which the data is transferred from the first output to the first bus, from the first bus to the first buffer storage, and from the first buffer storage to the first network adapter; and a second mode of operation, responsive to a failure of one of the plurality of storage devices in the storage module, in which data is transferred from the second output of the second bus to the second buffer storage with parity bits, wherein the error correction module verifies and corrects errors in the data prior to the data being transferred to the second network adapter.

9. The apparatus of claim 8, wherein the plurality of storage devices are dual port storage devices, each storage device within the plurality of storage devices having a first port connected to the first output of the storage module and a second output connected to the second output of the storage module.

10. The apparatus of claim 8, wherein the plurality of storage devices are hard disk drives.

11. The apparatus of claim 8, wherein each of the hard disk drives are dual port hard disk drives.

12. The apparatus of claim 8, wherein the first buffer storage and the second buffer storage are comprised of rotating buffers.

13. The apparatus of claim 8, wherein the apparatus includes a third mode of operation in which data is transferred from the first output to the first bus to the first buffer storage, data in the first buffer storage is transferred to the first network adapter and data is transferred from the second output to the second bus to the second buffer storage, and data in the second buffer storage is transferred to the second network adapter without activating the error correction module.

14. The apparatus of claim 8, wherein the data comprises a plurality of videos in the form of digital video files.

15. The apparatus of claim 8, wherein the first bus is a peripheral component interconnection bus and the second bus is a peripheral component interconnection bus.

16. The apparatus of claim 8, wherein the first network adapter is an ATM network adapter and the second network adapter is an ATM network adapter.

17. A data storage system comprising:

a first bus;

a second bus;

a storage module connected to the first bus and the second bus, wherein data is stored in the storage module; and a buffer storage connected to the first bus and the second bus the buffer storage including an error correction module;

means for transferring data to the buffer storage using the first bus until an error in data occurs in retrieving data from the storage module; and means, responsive to an error in retrieving data from the storage module, for transferring data to the buffer using the second bus and for checking errors in the data and correcting detected errors in the data using the error correction module.

18. The data storage system of claim 17, wherein the buffer storage includes a first buffer connected to the first bus and a second buffer connected to the second bus.

19. The data storage system of claim 18, wherein the second buffer is connected to the second bus by the error correction module.

20. The data storage system of claim 18, wherein the first buffer is a rotating buffer and the second buffer is a rotating buffer.

21. The data storage system of claim 17, further comprising a first network adapter connected to the first bus and a second network adapter connected to the second bus.

22. The data storage system of claim 20, wherein the data located in the first buffer is transferred from the first buffer to the first network adapter and data located in the second buffer is transferred to the second network adapter.

23. The data storage system of claim 21, wherein the first network adapter includes a direct connection to the first buffer and the data in the first buffer is transferred to the first network adapter using the direct connection.

24. The data storage system of claim 22, wherein the first and second network adapters are ATM network adapters.

25. The data storage system of claim 17, wherein the first bus is connected to a system bus in a computer.

26. The data storage system of claim 17, wherein the second bus is connected to a system bus in a computer.

* * * * *